Oct. 4, 1927.

E. W. HOOSIER 1,644,381

CLOTH CUTTING MACHINE

Filed Feb. 17, 1926

Inventor
Everett W. Hoosier,
by Justin L. Grearing.
his Attorney.

Patented Oct. 4, 1927.

1,644,381

UNITED STATES PATENT OFFICE.

EVERETT W. HOOSIER, OF BROOKLINE, MASSACHUSETTS.

CLOTH-CUTTING MACHINE.

Application filed February 17, 1926. Serial No. 88,923.

This invention relates to cutting machines of the kind having a rotary cutting blade, and particularly to machines adapted for cutting cloth or other flexible material.

Heretofore, motor driven cloth cutting machines, designed for manual movement, have been found to be heavy and difficult to operate for long periods of time, owing to the heavy and cumbersome construction and to the difficulty of quickly changing the direction of feed of the cutter, that is, where a curved cut is being made. In most of these machines of the prior art, the center of the motor is mounted considerably above the axis of the cutting blade, thus necessitating the provision of mechanism such as gears and the like for transmitting the rotation from the motor to the blade. Owing to the additional friction losses introduced by the indirect coupling between the motor and the blade, an objectionably large motor is required, and in order to obtain the desired power, the weight of the motor is objectionally increased and the external dimensions of the motor render its manipulation awkward and inconvenient. Furthermore, the location of the motor with its center above the axis of the blade makes the machine as a whole top heavy and more clumsy to operate.

Objects of the present invention are to overcome the above difficulties; to simplify the construction and improve the operation of cutting machines of the rotary blade type adapted for cutting cloth or other flexible material; to reduce the weight and external over-all dimensions of motor driven cutting machines of the rotary blade type; to improve the relation of the work to the cutting blade of the machine; and generally to improve the construction and efficiency of machines of the kind referred to.

In accordance with one aspect of the present invention, a cutting machine has a rotary cutting blade mounted directly on the shaft of the driving motor. A work directing shoe aids in supporting the machine. Means for controlling the movement of work past the cutting blade is disposed adjacent the work directing shoe in complementary relation thereto. This controlling means confines the work to a portion of the cutting blade adjacent to the shoe and limits transverse movement of the work away from the shoe. The bottom of the motor is spaced above the plane defined by a normal to the cutting blade and by the bottom surface of the shoe, to provide suitable space for movement of the work.

The work directing element complementary to the work directing shoe may project upwardly from beneath the motor in the general direction of the forward end of the shoe, the lower surface of the element being preferably convex to aid in guiding the work in relation to the blade. By making the angle of upward inclination of the forward part of the element substantially equal to the angle of downward inclination of the adjacent portion of the shoe and providing a stream line surface for each of said elements, the work is efficiently guided in relation to the cutting blade. The cutting blade is preferably of greater diameter than that of the motor, in order to provide the desired relation between the work and the machine when the machine is universally moved by sliding over the surface of a work supporting table.

These and other objects and features of the invention will be understood more clearly from the following detailed description and the accompanying drawing, in which.

Figure 1:
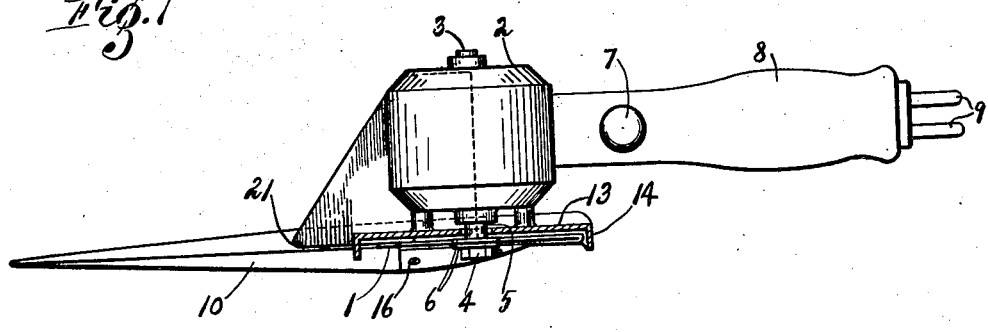
Fig. 1 is a plan of a cutting machine showing the guard for the cutting blade in horizontal section through the axis of the blade.

The cutting blade 1 consists of a thin circular disk of hard steel or other suitable material having a sharpened peripheral cutting edge, and is driven by the electric motor 2, having a barrel shaped frame or casing preferably of smaller diameter than that of blade 1. Blade 1 is coupled directly to the shaft 3 of the motor, the nut 4 threaded to the end of the shaft, being employed to make the blade fast to the shaft by pressing the blade toward the shoulder 5 of the shaft, washers 6 being provided, if desired, at opposite sides of disk 1.

The circuit of the electric motor is opened and closed to control the rotation of blade 1, by pressing or releasing push button 7 in the handle 8 of the machine, the button being within easy reach of the thumb or fore finger.

Connection of the machine with a power circuit is established by insertion of plug 9 in a corresponding jack (not shown) at the free end of a flexible conductor or the like (not shown).

Figure 2:
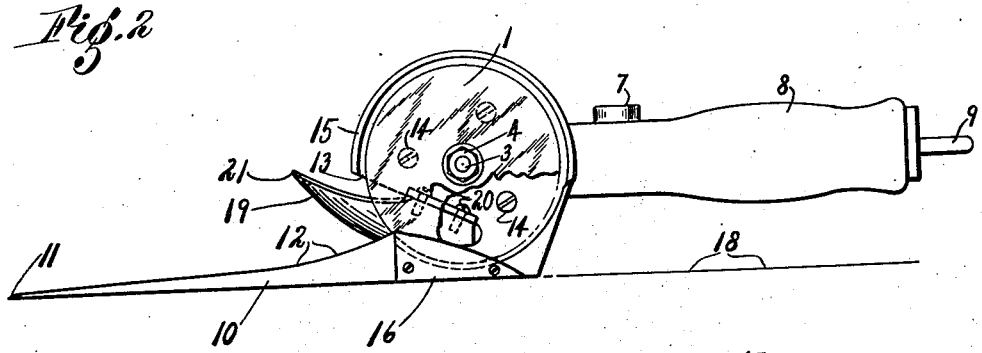
Fig. 2 is a side elevation with a portion of the cutting blade broken away to expose the construction behind the blade.
Figure 3:
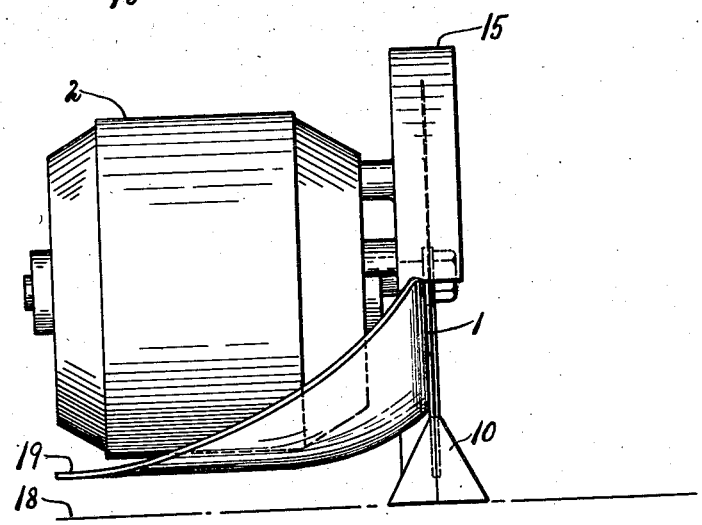
Fig. 3 is a front end elevation of the machine.

A shoe 10 of substantially triangular cross section has a long forward portion tapering to a point at 11. The portion 12 of the upper edge of the shoe curves upward at such an angle relatively to the tangent of the cutting blade 1 at the point where the edge 12 intersects the blade that efficient cutting of the work will take place. The shoe 10 partially supports the machine and may form an integral extension from the lower portion of a circular frame 13 disposed in a vertical plane and attached to one end of motor 2 by screws 14 or other suitable means. An annular flange 15 axially extending from the periphery of frame 13 serves as a guard for blade 1. The lower portion of frame 13 and of shoe 10 is recessed to provide a circular space for free rotation of blade 1, as shown by dotted lines, Figs. 2 and 3.

A section 16 of shoe 10 attached by screws or other suitable means to the main part of the shoe, may be removed so that one side of blade 1 is entirely exposed to view and is free to be removed from the recess within which it rotates and from the end of shaft 3.

The casing of motor 2 is preferably of smaller diameter than that of disk 1, so that blade 1 may operate upon one or more plies of cloth or other flexible sheet material passing beneath the motor with a minimum or small amount of bending or folding in the region where the cutting takes place. The bottom portion of the cutting edge of blade 1 is preferably disposed close to the bottom of shoe 10, so that the machine as a whole is located as near as possible to the plane defined by a normal to the blade 1 and by the bottom of shoe 10, indicated by dot-dash line 18, which may represent the approximate location of a piece of cloth or other work being cut or may be the work supporting surface of a table or floor upon which the machine may be universally moved by hand to perform the desired cutting of the work laying on surface 18.

A work directing guard element 19 joined by screws 20 or other suitable means to frame 13, depends from the frame close to one side of disk 1 and extends under the motor with a smooth curvature so that the surface is convex downward. The forward part of guard 19 projects upwardly from beneath the motor in the general direction of the forward end of shoe 10, and tapers toward a point 21 in the region of the plane of cutting disk 1, as shown in Fig. 1. The angle of upward inclination of the forward part of guard 19 is preferably substantially equal to the angle of downward inclination of the adjacent forward portion 12 of shoe 10.

The casing of motor 2, frame 13, guard 15, and guard 19, are preferably made of as thin material as possible, to provide the desired strength, and may be made of aluminum alloy or other relatively light weight, strong material to keep the total weight of the machine down to a minimum, so that it may be conveniently manipulated without quickly tiring the operator.

The speed of the motor is preferably high, and may be of the order of several thousand revolutions per minute when the cutting blade 1 is of the order of three inches in diameter. Shoe 10 is preferably relatively narrow, as illustrated, in order that the machine may be readily tilted on the axis of shoe 10, when it is desired to move the machine in a curved path. The space under motor 2, between guard 19 and surface 18, not only permits of free movement of work past the motor without ruffling of the work and other difficulties, but allows of tilting the machine on the axis of shoe 10 in a direction bringing the motor closer to the surface 18 of the work table, without appreciably obstructing the passage of the work in the vicinity of cutting blade 1. The under surface of guard 19 is made entirely free of possible obstructions to movement of cloth engaging therewith, the surface being of stream line shape which in the vicinity of the place where cutting occurs is complementary to the upper stream line surface of shoe 10.

By mounting the cutting disk directly on the shaft of the electric motor, the entire power of the motor is available for cutting operations, and none is lost through the use of gears or other energy consuming devices between the motor and the cutter disk. Owing to the high speed of rotation of the cutter disk, the use of gears or other indirect transmission means would involve exceptionally large losses and would require a correspondingly large motor to provide sufficient power to supply these losses in addition to the useful energy of the cutting disk. As these objectionable elements are eliminated, it is possible to employ a very light weight motor which may be compactly assembled close to the cutting disk.

The center of the motor is substantially in line with the axis of the cutting disk and the center of gravity of the machine is below this axis, so that the machine may be very conveniently manipulated by means of handle 8. In order to tilt the machine in one direction or the other, as when making a curved cut, it is only necessary to raise or lower handle 8 slightly, with reference to shoe 10, while sliding the machine on supporting surface 18.

The moment of inertia of the machine as a whole about the axis of shoe 10 is substantially the minimum possible value owing to the minimum weight of the machine and the minimum distance between the center of gravity of the machine and the center of the disk or the axis of shoe 10, and the machine may be more readily controlled than in the case of machines wherein the motor is removed a further distance from the cutter axis or the axis of the supporting shoe. It has been found from actual experience with a machine of the type disclosed, that far greater cutting speed is practicable than with the other types of machines, it being possible to cut one or a few plies of cloth, such as curtain material, at a rate of several feet per second under normal operating conditions.

Owing to the relatively light weight of the machine as a whole, and the effective arrangements of its parts, an operator is enabled to work more rapidly and with less fatigue than when operating machines of the prior art.

I claim:

1. In a machine for cutting flexible material, a cutter disk, a motor having a shaft directly coupled with said disk, and a shoe for directing the work in relation to said disk, said machine having a work directing portion close to said disk and extending therefrom in such relation to said shoe as to cooperate therewith for smoothly guiding the work passing said motor.

2. In a machine for cutting flexible material, a cutter disk, a motor having a shaft directly coupled with said disk, a shoe for directing the work in relation to said disk, the bottom of said motor being spaced above the plane defined by a normal to said disk and by the bottom surface of said shoe, and a work directing element in complementary relation with said shoe for confining the work to a portion of said disk adjacent to said shoe.

3. In a machine for cutting flexible material, a cutter disk, a motor having a shaft directly coupled with said disk, a shoe for directing the work in relation to said disk, and a work directing element having a smooth surface disposed above the place where the work engages with said disk for limiting transverse movement of the work away from said shoe.

4. In a machine for cutting flexible material, a cutter disk, a motor having a shaft directly coupled with said disk, a shoe for directing the work in relation to said disk, the bottom of said motor being spaced above the plane defined by a normal to said disk and by the bottom surface of said shoe, and a work directing element projecting upwardly from beneath said motor in the general direction of the forward end of said shoe, the lower surface of said element being convex.

5. In a machine for cutting flexible material, a cutter disk, a motor having a shaft directly coupled with said disk, a shoe for directing the work in relation to the cutting edge of said disk, the bottom of said motor being spaced above the plane defined by a normal to said disk and by the bottom surface of said shoe, and a work directing element projecting upwardly from beneath said motor in the general direction of the forward end of said shoe, the forward part of said element being tapered toward a point in the region of the plane of said disk.

6. In a machine for cutting flexible material, a cutter disk, a motor having a shaft directly coupled with said disk, a shoe for directing the work in relation to the cutting edge of said disk, the bottom of said motor being spaced above the plane defined by a normal to said disk and by the bottom surface of said shoe, and a work directing element projecting upwardly from beneath said motor in the general direction of the forward end of said shoe, the lower surface of said element being convex, the angle of upward inclination of the forward part of said element being substantially equal to the angle of downward inclination of the adjacent forward portion of said shoe.

7. In a machine for cutting flexible material, a cutter disk, a motor having a shaft directly coupled with said disk, a shoe having a stream line surface for directing the work in relation to the cutting edge of said disk, and a work directing element in front of and beneath said motor having a stream line surface for permitting of the high speed passage of work beneath said motor.

8. In a machine for cutting flexible material, a cutter disk, a motor close to said disk and having a shaft directly coupled therewith, a work directing shoe extending forward from beneath said disk, a frame for supporting said shoe, and a complementary work directing element supported from said frame and having a free end extending therefrom beneath said motor.

9. In a machine for cutting flexible material, a cutter disk, a motor having a shaft directly coupled with said disk, and a shoe for directing the work in relation to said disk, said machine having a work directing portion close to one side of said disk and above said shoe for guiding the work passing said motor.

In witness whereof I hereunto subscribe my name this 16th day of February, 1926.

EVERETT W. HOOSIER.